(12) United States Patent
Tien

(10) Patent No.: US 6,846,192 B2
(45) Date of Patent: Jan. 25, 2005

(54) ELECTRICAL CARD CONNECTOR HAVING CARD RETENTION MECHANISM INTEGRALLY FORMED WITH AN EJECTOR

(75) Inventor: Yung-Cheng Tien, Hsin-Chuang (TW)

(73) Assignee: Tekcon Electronics Corp., Taipei Hsien (TW)

(*) Notice: Subject to any disclaimer, the term of this patent is extended or adjusted under 35 U.S.C. 154(b) by 221 days.

(21) Appl. No.: 10/645,898

(22) Filed: Aug. 20, 2003

(65) Prior Publication Data

US 2004/0092146 A1 May 13, 2004

(30) Foreign Application Priority Data

Nov. 13, 2002 (TW) ........................................ 91218167 U

(51) Int. Cl.[7] .............................................. H01R 13/62
(52) U.S. Cl. ...................................................... 439/159
(58) Field of Search ................................ 439/159, 160, 439/157, 155, 152, 630, 607, 608, 609, 610, 267

(56) References Cited

U.S. PATENT DOCUMENTS

| | | | |
|---|---|---|---|
| 6,394,827 B2 * | 5/2002 | Nogami | 439/159 |
| 6,394,843 B1 * | 5/2002 | Chang et al. | 439/607 |
| 6,478,591 B1 * | 11/2002 | Chang | 439/159 |
| 2001/0055897 A1 | 12/2001 | Nogami | |

* cited by examiner

Primary Examiner—Son V Nguyen
(74) Attorney, Agent, or Firm—Wei Te Chung

(57) ABSTRACT

An electrical card connector (100) is adapted for connecting an electrical card. The electrical card connector includes an insulative housing (2) having a side wall (22), a plurality of conductive terminals (6) received in the insulative housing, and an ejector (5) mounted on the side wall. The side wall having an elongated inclined surface (221). A slat (224) is defined in a lower end of the inclined surface. The ejector includes an insulative slider (5) arranged on the side wall of the housing and movably in a rear to front direction. The slider has a locking branch (53) sliding on the inclined surface. The locking branch has a locking portion (531) engaging with a recess in a side portion of an inserted card. The inserted card is removed from the electrical connector by engagement of the locking portion with said slot.

8 Claims, 8 Drawing Sheets

US 6,846,192 B2

ELECTRICAL CARD CONNECTOR HAVING CARD RETENTION MECHANISM INTEGRALLY FORMED WITH AN EJECTOR

BACKGROUND OF THE INVENTION

1. Field of the Invention

The present invention relates to connectors, and especially to a card connector for electrically connecting a card to an electrical device.

2. Description of the Related Art

All kinds of electrical cards are commonly used in electrical devices such as PDA, digital camera, etc, and the devices have an electrical card connector with an ejector so as to remove an inserted card out of the card connector.

An electrical card connector disclosed in U.S. Patent Application Publication No. 2001/0055897 published on Dec. 27, 2001 comprises a case, and a slider provided within the case for sliding along with the card in the insertion/removal direction. The slider includes a card retaining arm for retaining an inserted card in a full-insertion position. The card retaining arm has an inward projection and a downward projection on a rear end thereof. The housing has a raised portion. The card is inserted into the connector, the inwardly projection engages with a retention notch in a side portion of the card and moves forwardly together with the card. The downwardly projection abuts against an inner surface of the raised portion, whereby the inwardly projection is prevented from moving outwardly and retains the card in the full insertion position. The card is ejected, the card retaining arm moves rearwardly together with the card. The downward projection disengages with the inner surface of the raised portion and a rear end of the card retaining arm is prevented from moving further by a stop surface of the housing. The card retaining arm moves outwardly and the inward projection disengages with the card, thereby the card moves rearwardly smoothly. However, the card retention and removing operation needs cooperation of a number of elements. One of the elements runs out of work, the card retention or removing action well not be reached.

BRIEF SUMMARY OF THE INVENTION

Accordingly, an object of the invention is to provide an electrical card connector with simple structure to prevent an inadvertent ejection of an electrical card.

An electrical card connector is adapted for connecting an electrical card. The electrical card connector includes an insulative housing having a side wall, a plurality of conductive terminals received in the insulative housing, and an ejector mounted on the side wall. The side wall having an elongated inclined surface. A slot is defined in a lower end of the inclined surface. The ejector includes an insulative slider arranged on the side wall of the housing and movably in a rear to front direction. The slider has a locking branch sliding on the inclined surface. The locking branch has a locking portion engaging with a recess in a side portion of an inserted card. The inserted card is removed from the electrical connector by engagement of the locking portion with said slot.

DETAILED DESCRIPTION OF THE INVENTION

Figure 1:
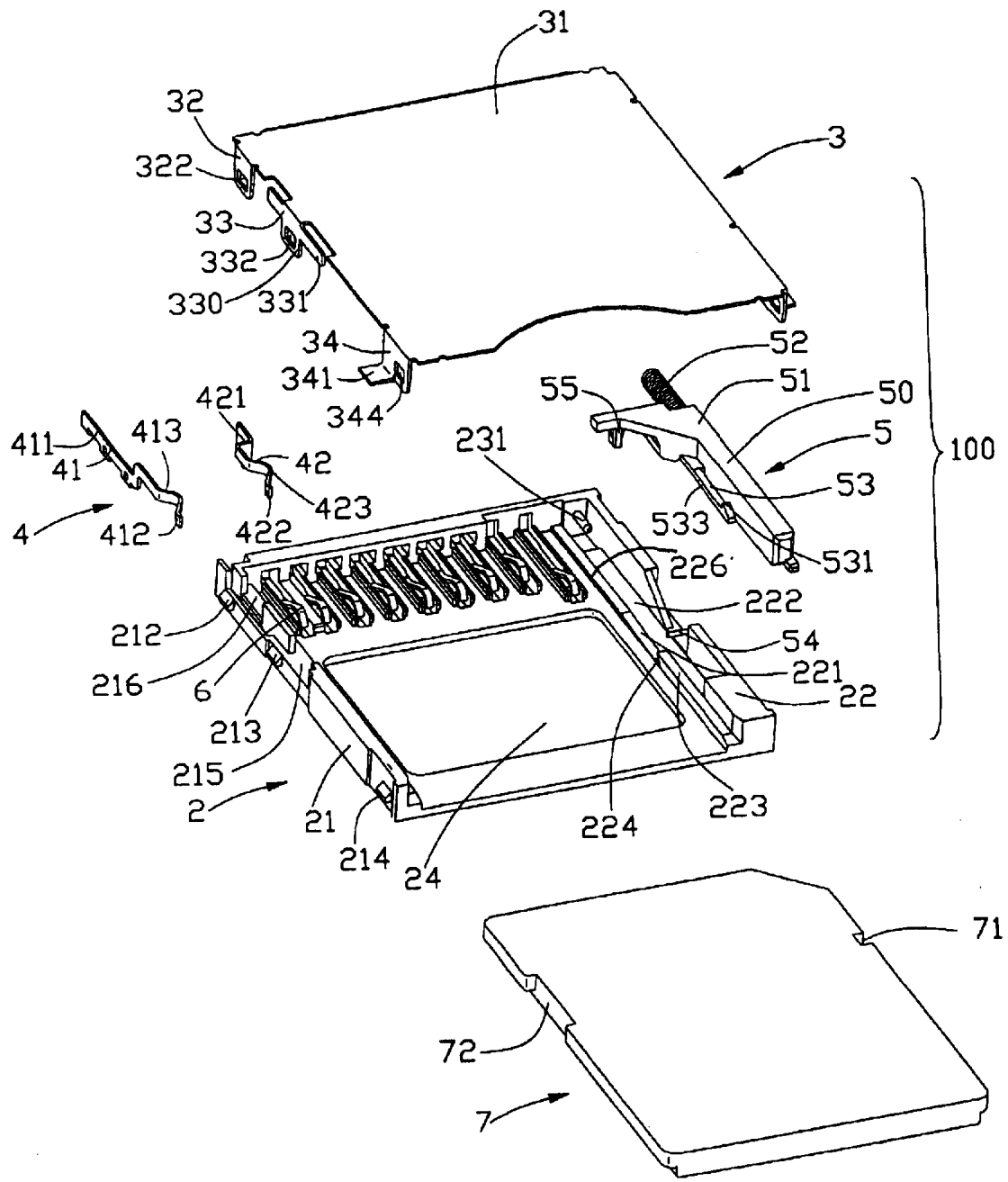
FIG. 1 is an exploded view of an electrical card connector according to the present invention and an electrical card.

Referring to FIG. 1, an electrical card connector 100 comprises an insulative housing 2, a pair of switch contacts 4, an ejector 5 and a plurality of conductive terminals 6 mounted on the housing 2, and a shell 3 shielding the housing 2.

Figure 3:
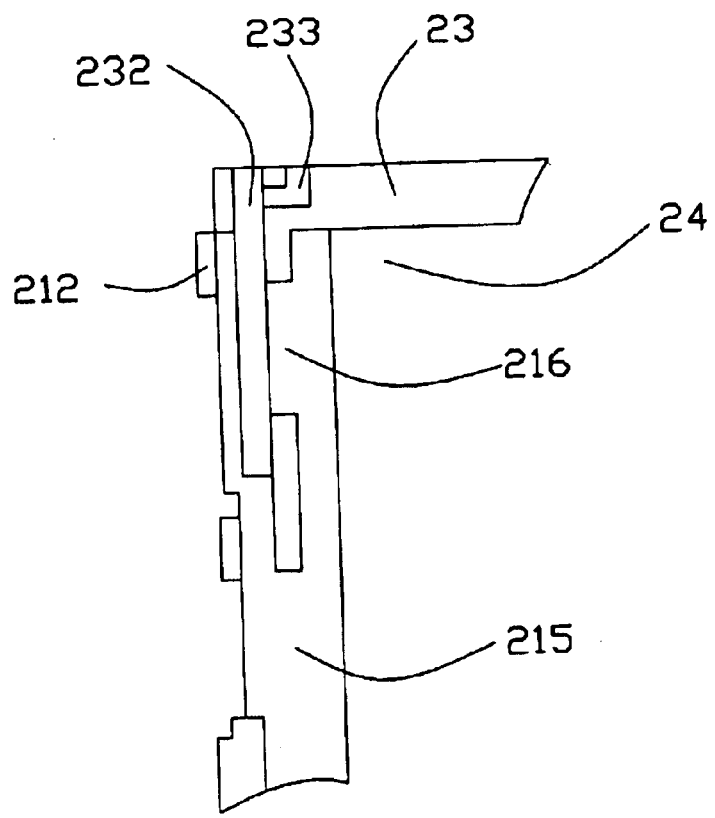
FIG. 3 is a top planar view of a comer of an insulative housing, wherein the switch contacts are mounted.
Figure 4:
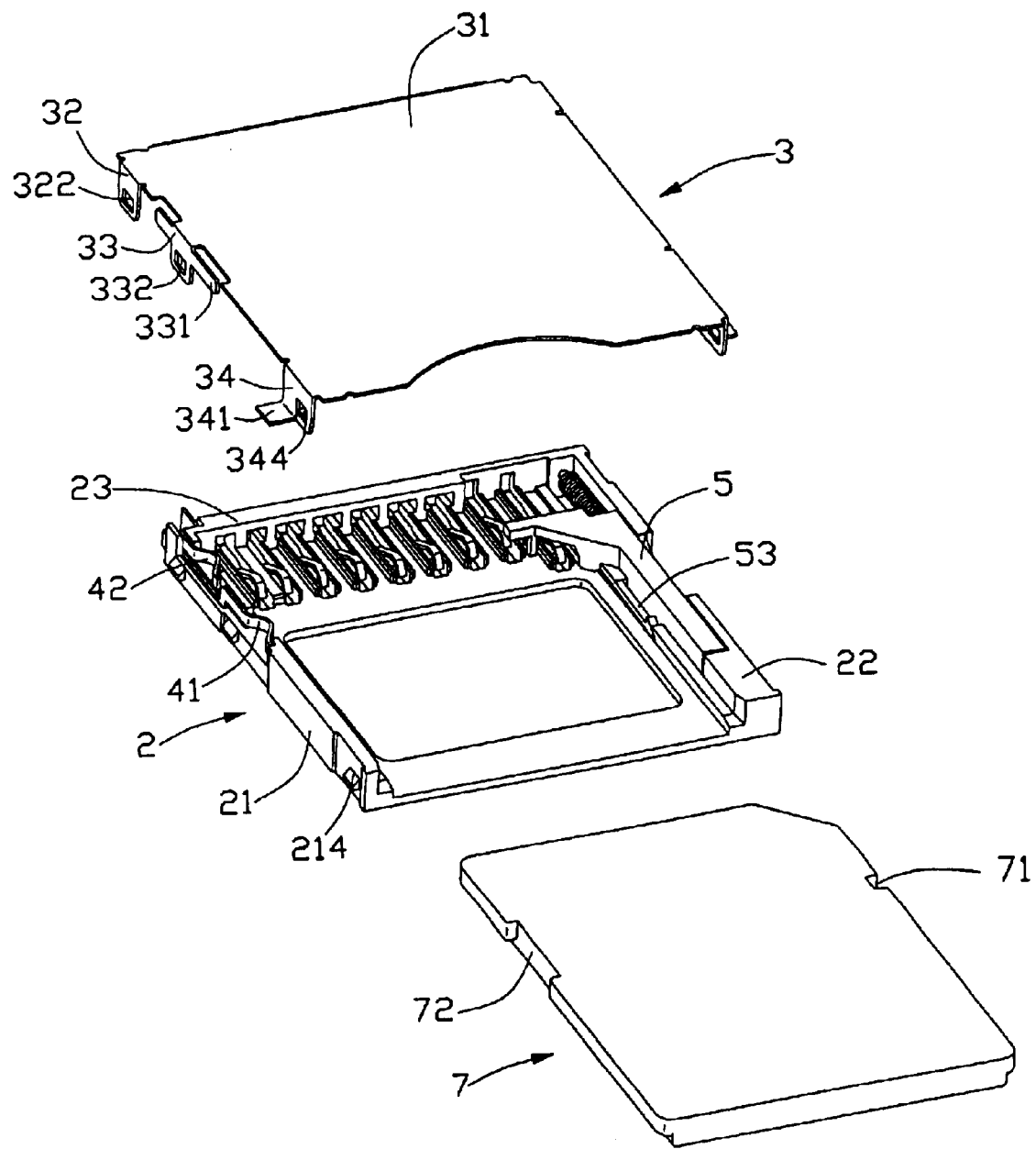
FIG. 4 is a partially assembled view of FIG. 1.

Referring to FIGS. 1 and 3, the housing 2 comprises a first and a second side walls 21, 22, a front wall 23 connecting the first and the second side walls 21, 22 and a receptacle portion 24 defined therebetween for receiving an electrical card 7. A pair of first latches 212, a pair of second latches 213 and a pair of third latches 214 are arranged on outer surfaces of the first and the second side walls 21, 22. The first side wall 21 defines a straight first slit 232 in a longitudinal direction and through the front wall 23, and a first and a second cutout 215, 216 communicating with the receptacle portion 24. The front wall 23 defines a second slit 233 adjacent to the first slit 232. The second wall 22 includes an elongated groove 222 and an elongated raised portion 223 between the groove 222 and the receptacle portion 24. The raised portion 223 has an inclined surface 221 and a V-shaped slot 224 defined in a front end of the inclined surface 221. The V-shaped slot 224 has an inclined rear surface 225 (shown in FIG. 4). The inclined rear surface 225 and the inclined surface 221 constitute a cute angle therebetween. The front wall 23 includes a post 231 extending rearwardly and adjacent to the second side wall 22.

The shell 3 comprises a planar top wall 31, a pair of first tabs 32 and a pair of second tabs 34 extending downwardly from opposite sides of the top wall 31 and a substantially T-shaped pad 33 extending downwardly from one side of the top wall 31. Each second tab 34 further includes a soldering piece 341 extending outwardly from a lower portion thereof. Each first tab 32, the pad 33 and each second tab 34 defines a first, second and third notches 322, 332 and 344 in lower portions thereof for respectively engaging with the first, second and third latches 212, 213 and 214. The T-shaped pad 33 includes a vertical part 330 and a pair of contact ends 331 extending from opposite sides of the vertical part 330. Said second notch 332 is defined in the vertical part 330.

Figure 2:
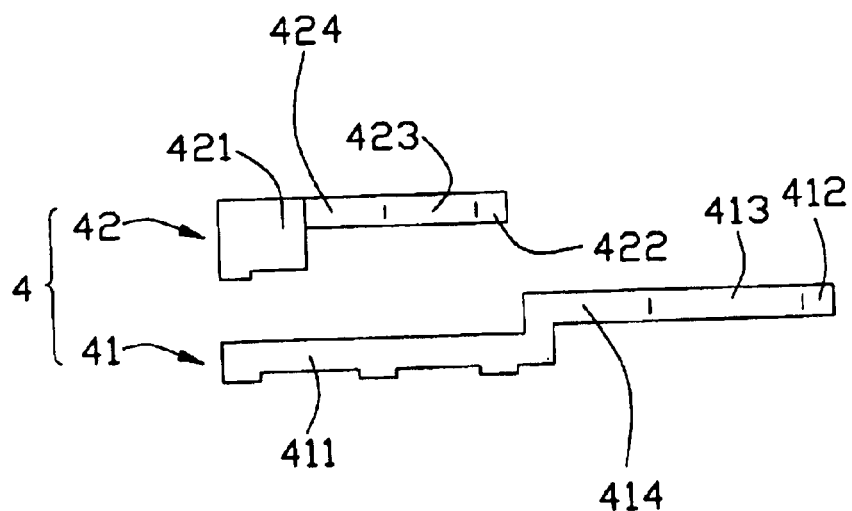
FIG. 2 is side view of a pair of switch contacts.

Referring to FIGS. 1 and 2, the switch contacts 4 comprise a first switch contact 41 and a second switch contact 42. The first switch contact 41 comprises a first elongated holding portion 411, a first connecting portion 414 extending upwardly from a rear portion of the holding portion 411, a first arced spring portion 413 extending rearwardly from the connecting portion 411 and a first contact portion 412 on a free end of the first spring portion 413. The second contact 42 comprises a second holding portion 421, a second connecting portion 424 extending upwardly and laterally from a rear end of the second holding portion 421, a second arced spring portion 423 extending rearwardly from the second holding portion 421 and a second contact portion 422 on a free end of the second spring portion 423. The second switch 42 has a length less than that of the first holding portion 411.

Referring to FIG. 1, the ejector 5 comprises a unitary formed L-shaped slider 51, a spring 52 and a locking rod 54. The spring 52 is attached to the slider 51 by being partially received in a hole (not shown) defined in a front portion of the slider 51 or being engaged with a post (not shown) on the front portion of the slider 51. The slider 51 has an elongated base portion 50, an actuator 55 projecting laterally for engaging with a front end of the electrical card 7, a locking branch 53 extending rearwardly from the slider 51 and a heart-shaped cam groove (not shown) in an outer side surface of the slider 5 1. The locking rod 54 is mounted on an outer side of a low portion of the second side wall 22 and engages with the heart-shaped groove for facilitating a push-push ejection of the electrical card, which is common used in the art and a detailed description is omitted herein. The locking branch 53 includes a spring arm 533 and a locking portion 531 disposed at a free end of the spring arm 533. The locking portion 531 preferably has an inclined rear face 532 (shown in FIGS. 4 and 5) corresponding to the inclined rear surface 225 of the slot 224.

Referring to FIGS. 1, 2, 3 and 4, in assembly, the conductive terminals 6 are mounted in the front wall 23 of the insulative housing 2 with contact fingers (not labeled) extending into the receptacle portion 24 for electrically engaging with golden fingers (not shown) of the electrical card 7. The ejector 5 is installed on the second side wall 22. A free end of the spring 52 engages with the post 231. The base portion 50 is received in the elongated groove 222 of the housing 2 and is movable in a front-to-rear direction. The locking branch 53 is located on the raised portion 223 with the locking portion 531 temporarily received in the slot 224. The inclined face 532 abuts against the inclined surface 225.

The switch contacts 4 are mounted on the first side wall 21. The first holding portion 411 is secured in the first slit 232. The first spring portion 413 extending into the receptacle portion 24 from the first cutout 215. The second holding portion 421 is secured in the second slit 233. The second connecting portion 424 is located above the first holding portion 411 and spaced from the first holding portion 411 in a vertical direction. The second spring portion 423 extends into the receptacle portion 24 from the second cutout 216. The second connecting portion 424, the second spring contact 423 is in a substantially same longitudinal line with the first switch contact 41. The first, second and third notches 322, 332 and 344 respectively engage with the first, second, and third latches 212, 213 and 214, thereby mounting the shell 3 on the housing 2. The electrical card connector 100 is mounted on a printed circuit board (PCB, not shown). The soldering pieces 341 of the shell 3 respectively engage with a grounding circuit on the PCB.

Figure 5:
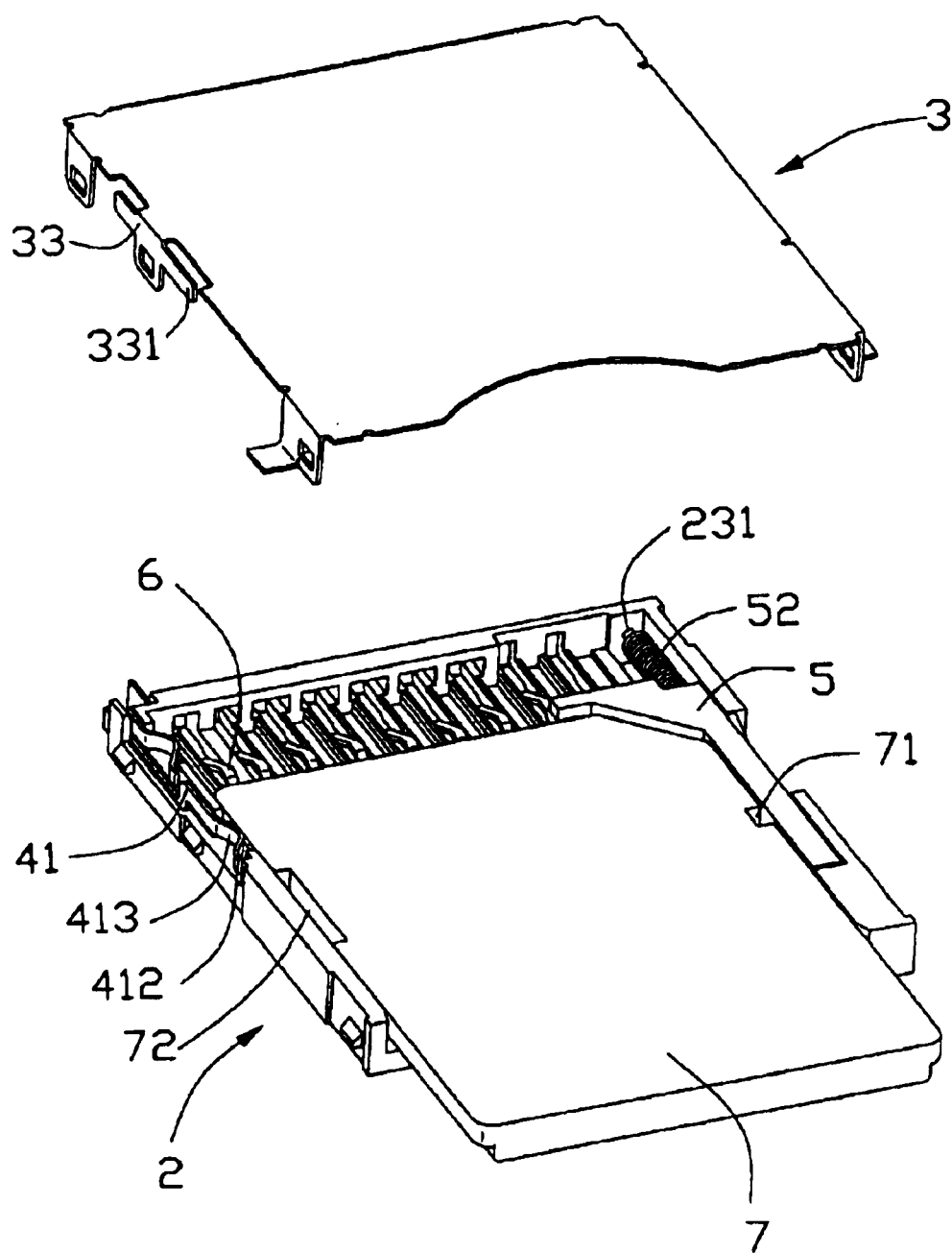
FIG. 5 is a partially assembled view of FIG. 1 with the card being inserted into electrical card connector initially.
Figure 6:
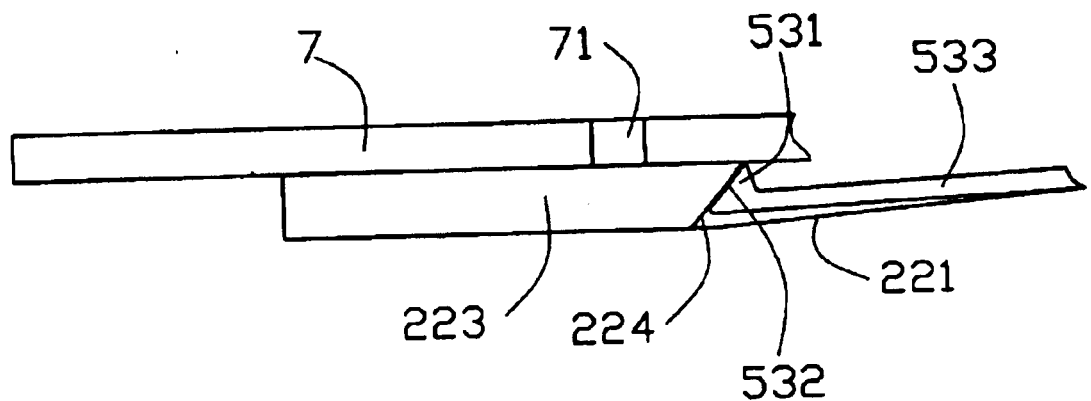
FIG. 6 is a schematic view for FIG. 3, showing an engagement of a locking portion of an ejector with a slot of a sidewall of a housing.
Figure 10:
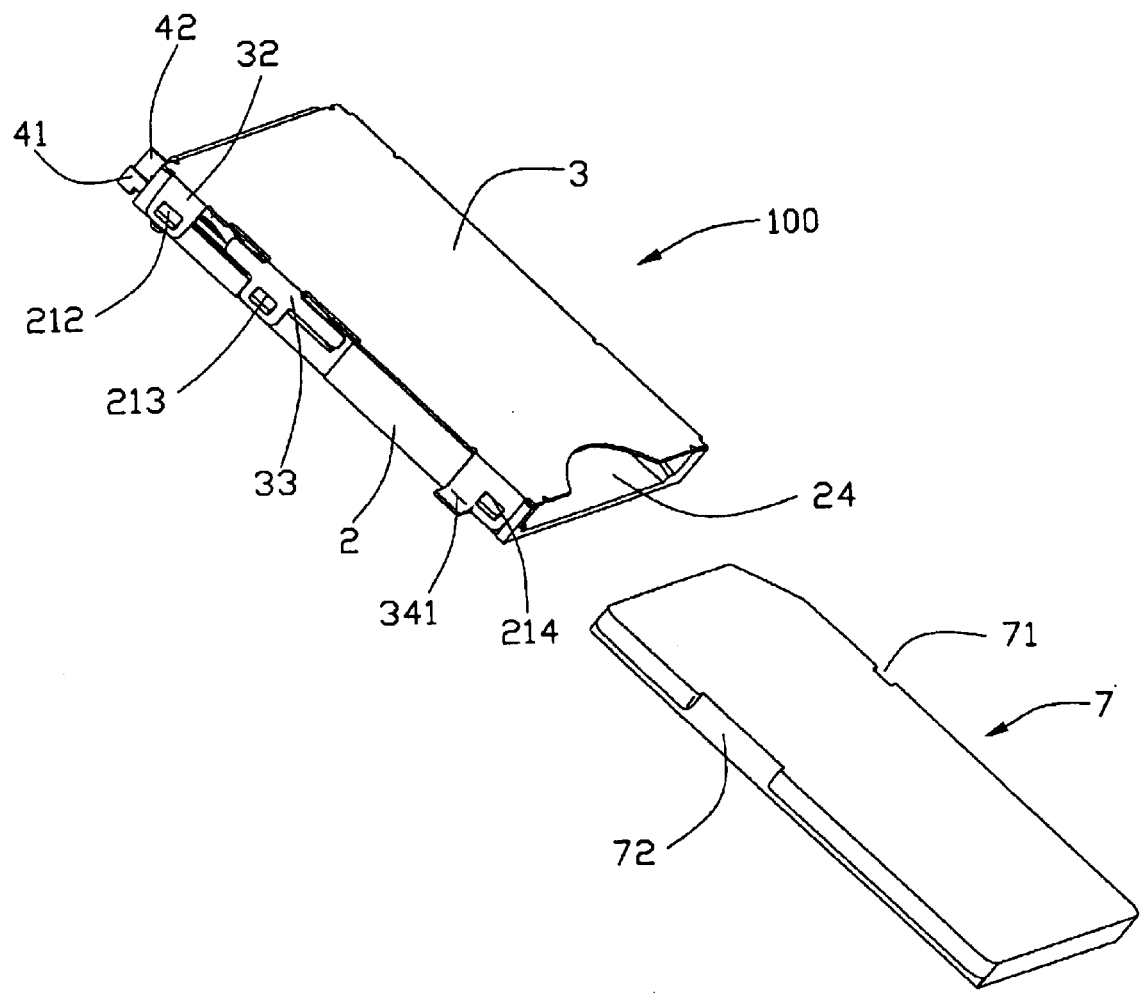
FIG. 10 is an assembled view of FIG. 1 with the card fully inserted therein.

Referring to FIGS. 5, 6 and 10, the electrical card 7 is inserted into the electrical connector 100. A side surface of the electrical card 7 presses against the first spring portion 413 of the first switch contact 41. The first spring portion 413, together with the first contact portion 412, moves laterally, and the first contact portion 412 comes into connecting with a corresponding contact end 331 of the shell 3 for facilitating write-protect of the electrical card 7, at the time, the locking portion 531 is still received in the slot 224.

Figure 9:
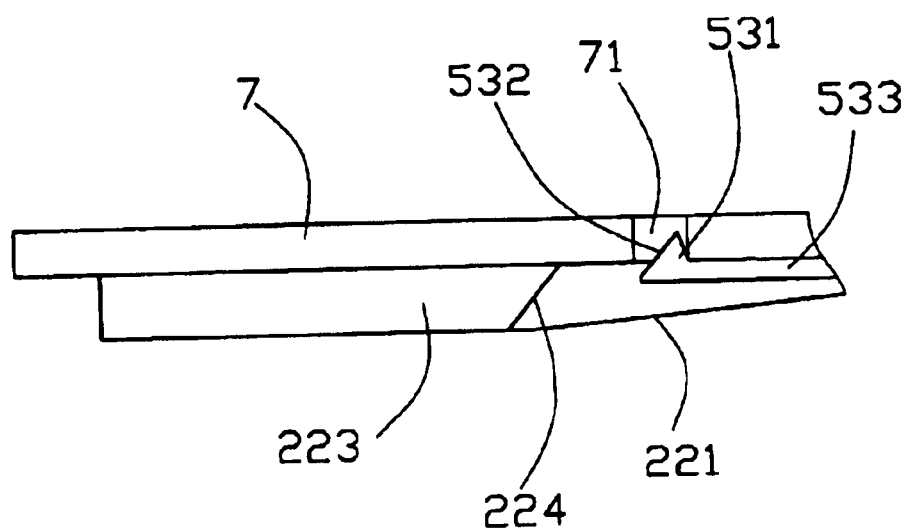
FIG. 9 is a schematic view for FIG. 5 or FIG. 6, showing the locking portion of the ejector with a first recess in a side portion of the card.
Figure 7:
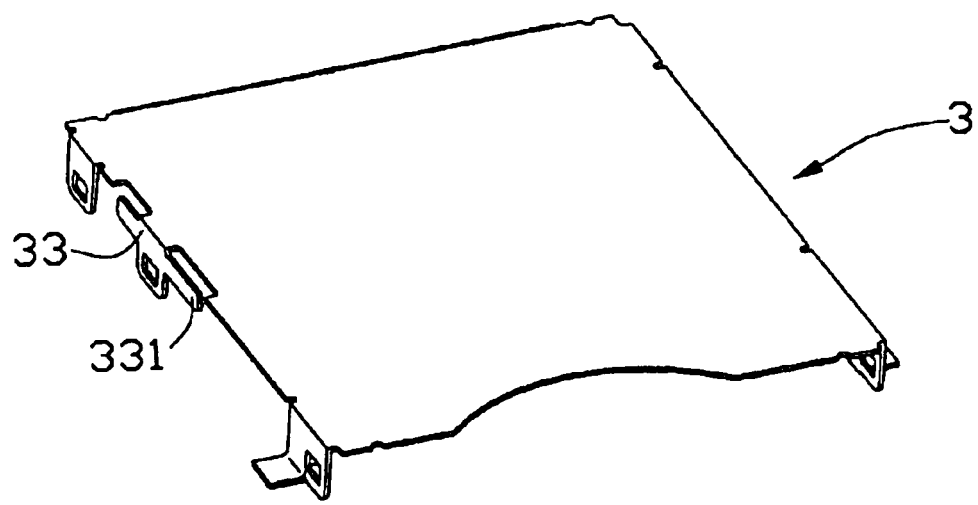
FIG. 7 is a partially assembled view of FIG. 1 during insertion of the card.
Figure 7:
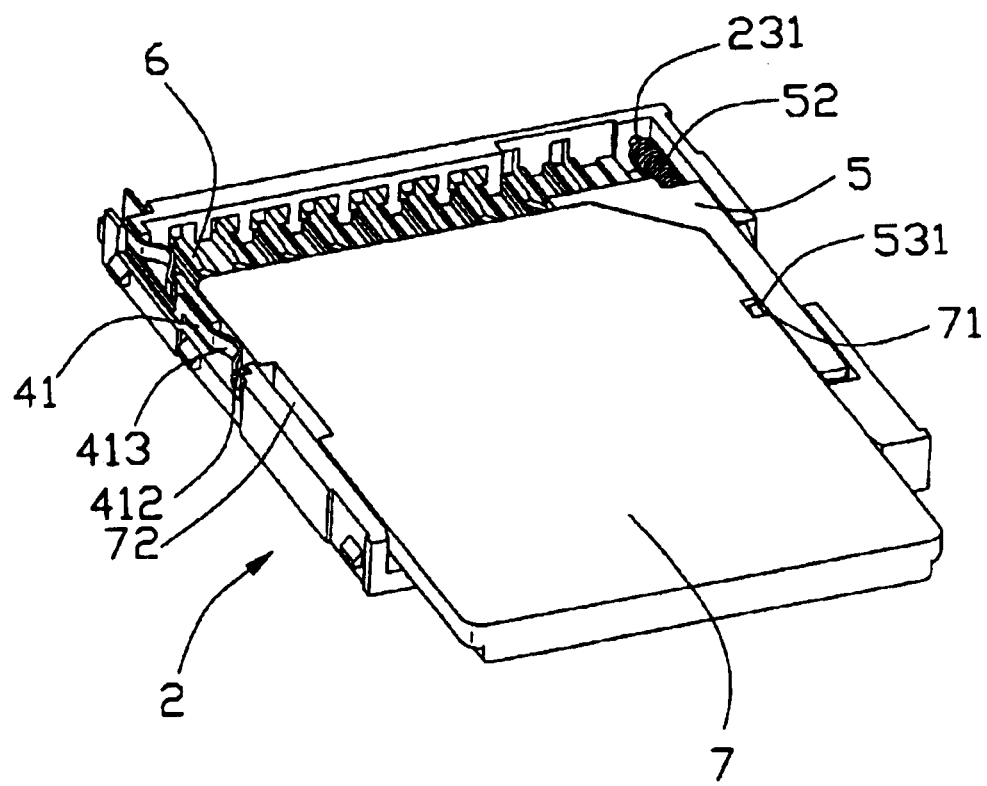

Referring to FIGS. 7 and 9, the electrical card 7 is further inserted into the electrical connector 100, a front surface of the electrical card 7 pushes the actuator 55 of the slider 5 to move forwardly and the spring is depressed. The locking portion 531 moves forwardly and upwardly along the inclined surface 221 and moves out of the slot 222 to engage with a first recess 71 in one side of the electrical card 7.

Figure 8:
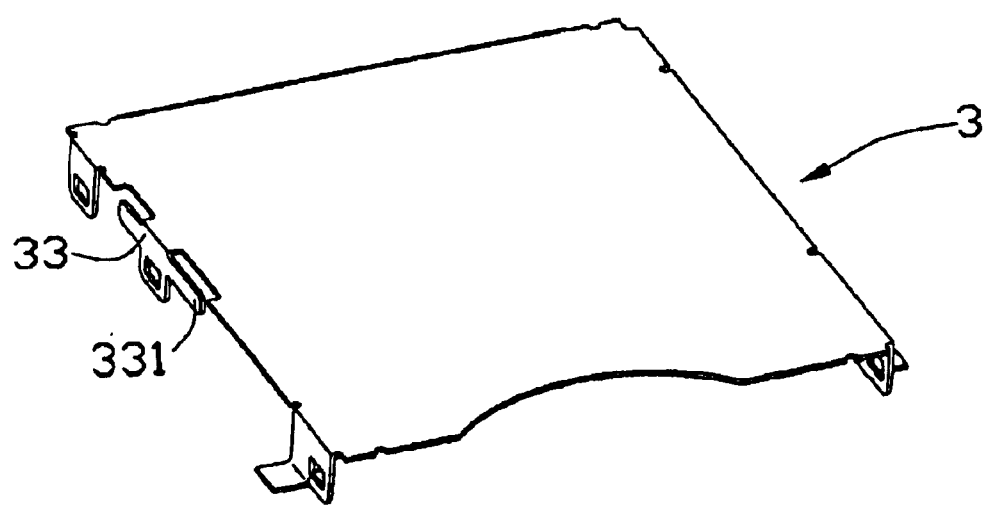
FIG. 8 is a partially assembled view of FIG. 1 with the card being fully inserted into the electrical card connector.
Figure 8:
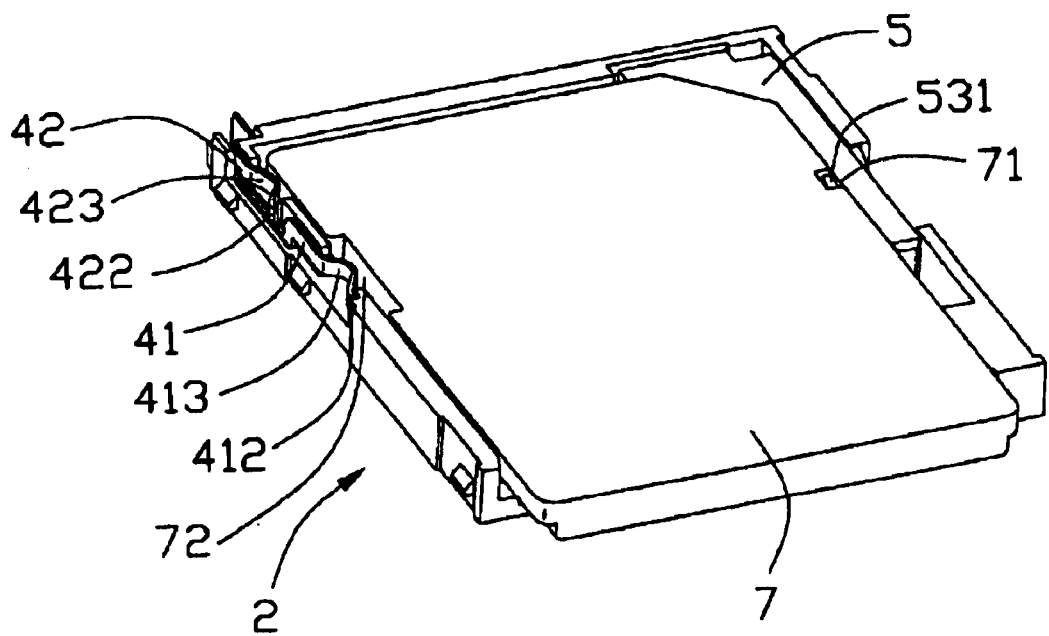

Referring to FIGS. 8, 9 and 10, the electrical card 7 is fully inserted into the electrical connector 100 and reaches a working position. The side surface of the electrical card 7 presses against the second spring portion 423 of the second switch contact 42. The second spring portion 413, together with the second contact portion 422, moves laterally, and the second contact portion 422 comes into connecting with a corresponding contact end 331 of the shell 3 for detecting the insertion of the electrical card 7. The spring portion 413 with the contact portion 412 release spring thereof into a second recess 72 of the card, thereby disengaging with the corresponding contact portion of the pad 33 of the shell 3. The ejector S is locked at the working position by engagement of the locking rod 54 with the heart-shaped cam groove which is well know in the art. The locking branch 53 is seated upon the upward engagement face 226 without possibility of downward movement and the locking portion 531 engages with the first recess 71 of the electrical card 7 so as to prevent an inadvertent ejection of the electrical card 7.

The card 7 is ejected from the electrical card connector 100. Exert a forward force on the electrical card 7, the locking rod 54 moves out of the locking position of the heart-cam groove. The compressed spring 52 urges the slider 51 to move rearwardly so as to push the electrical card 7 to moves rearwardly. The locking portion 531 moves rearwardly and downwardly along the inclined surface 221, then arrives in the slot 224 and disengages with the first recess 71 of the electrical card 7. The electrical card 7 moves out of the electrical card connector 100 smoothly.

It is noted that in the current embodiment, the up and down deflectable locking branch 53 is located essentially under the inserted electrical card and the locking portion 531 extends upwardly at the distal free end of the locking branch 531. Alternatively, the up and down deflectable locking branch 53 can be located beside the electrical card and the corresponding locking portion 531 extends inwardly/laterally toward the inserted electrical card at the distal free end of the locking branch 53 and the corresponding locking face of the locking portion 531 can be in a form of a vertical plane or a sideward inclined face instead of the current upward inclined face. Under this situation, the locking branch 53 may not require to be engaged with the upward engagement face 226 while still keeping reliable retention between the locking portion 531 in the recess 71. Therefore, in such an alternative embodiment, it is allowed for the connector to accommodate the different type electrical cards with or without the first recess 71 thereof, as pursued by the aforementioned publication number 2001/0055897. On the other hand, even if under the current embodiment as shown in the drawings, such a dual-accommodation function may still be implemented by means of changing the slanting locking face of the locking portion 531 to a vertical type, and removing engagement between the locking branch 53 and the upward engagement face 226 and setting the locking branch 53 in an undeflected manner when said locking portion 531 is received in the first recess 71.

It is to be understood, however, further though numerous, characteristics and advantages of the present invention have been set fourth in the foregoing description, together with details of the structure and function of the invention, the disclosed is illustrative only, and changes may be made in detail, especially in matters of shape, size, and arrangement of parts within the principles of the invention to the full extent identify by the broad general meaning of the terms in which the appended claims are expressed.

What is claimed is:

1. An electrical card connector adapted for connecting an electrical card, comprising:

an insulative housing having a receptacle portion, an inclined surface adjacent to the receptacle portion and a slot at a lower end of the inclined surface;

a plurality of conductive terminals received in the insulative housing;

an ejector mounted to the housing, the ejector having a locking branch aligned with the inclined surface of the housing, the locking branch having a locking portion upwardly exposed to the receptacle portion; wherein the locking portion is releasably engagable with the slot; wherein the slot of the housing has an acute-angled front portion with an inclined surface, and wherein the locking portion has an inclined face corresponding to the inclined surface of the slot; wherein the electronic card defining a notch at one side thereof; wherein when said electronic cad is initially inserted into the receptacle portion, said locking branch extends in an outwardly spreading manner to have the locking portion retained in said slot for not interfering with the electronic card so that said electronic card is able to be freely inserted into the receptacle portion; while when said electronic card is further inserted into the receptacle portion deeper, the locking branch extends in a inward shrunk matter to have the corresponding locking portion received in the notch of the electronic card so as not to allow said electronic card to be backwardly withdrawn from the receptacle portion.

2. The electrical card connector according to claim 1, wherein the insulative housing further includes side walls and a front wall, the front wall including a post extending rearwardly and adjacent to one of the side walls.

3. The electrical card connector according to claim 2, wherein the ejector includes a slider and a spring attached to a front end of the slider, a free end of the spring engaging with the post.

4. The electrical card connector according to claim 2, wherein the one of the side walls includes an elongated groove and an elongated raised portion between the groove and the receptacle portion.

5. The electrical card connector according to claim 1, wherein said locking branch is up and down deflectable.

6. The electrical card connector according to claim 5, wherein said locking branch is located beneath the electronic card.

7. The electrical card connector according to claim 6, wherein said locking portion extends upwardly relative to the locking branch.

8. The electrical card connector according to claim 1, wherein when said electronic card is fully received in the receptacle portion, said locking branch engages the housing and can not be deflected.

* * * * *